(12) United States Patent  
Singhal (10) Patent No.: US 6,256,666 B1  
(45) Date of Patent: Jul. 3, 2001

(54) METHOD AND SYSTEM FOR REMOTELY MANAGING ELECTRONIC MAIL ATTACHMENTS

(75) Inventor: Sandeep K. Singhal, Raleigh, NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/115,299

(22) Filed: Jul. 14, 1998

(51) Int. Cl.[7] ................................................. G06F 15/16
(52) U.S. Cl. ........................... 709/217; 709/203; 709/206
(58) Field of Search ..................................... 709/200, 217, 709/202, 203, 206, 204, 248

(56) References Cited

U.S. PATENT DOCUMENTS

| | | | |
|---|---|---|---|
| 5,509,000 | * | 4/1996 | Oberlander .......................... 370/409 |
| 5,727,159 | * | 3/1998 | Kikinis ................................. 709/246 |
| 5,838,252 | * | 11/1998 | Kikinis ............................. 340/825.44 |
| 5,844,969 | * | 12/1998 | Goldman et al. .................. 379/93.24 |
| 5,845,203 | * | 12/1998 | LaDue ................................... 455/414 |
| 5,903,723 | * | 5/1999 | Beck et al. ............................. 707/10 |
| 5,905,777 | * | 5/1999 | Foladare et al. .................. 379/90.01 |
| 5,964,833 | * | 10/1999 | Kikinis ................................. 709/206 |
| 5,978,837 | * | 11/1999 | Foladare et al. ..................... 709/207 |
| 6,003,070 | * | 12/1999 | Frantz .................................. 709/206 |
| 6,023,700 | * | 2/2000 | Owens et al. .......................... 707/10 |

\* cited by examiner

*Primary Examiner*—Saleh Najjar  
(74) *Attorney, Agent, or Firm*—A. Bruce Clay (57) ABSTRACT

A device having a low-capability display, such as a mobile phone, may be used to direct a software agent to process and deliver large or complex documents embedded inside an electronic mail document. A user can delete attachments from server memory and remotely invoke a viewing application, control its behavior, and direct its output. For example, a user can direct the output to a local printer, initiate its transmission by fax, or initiate a screen reader program to deliver the message over a voice telephone call.

48 Claims, 6 Drawing Sheets

```
200 {
    To: fred@host.nowhere.org ——————————————————— 201
    From: peter@hohum.nowhere.com ————————————— 202
    Subject: Sample message ——————————————————— 203
    Date: Mon 24 Feb 1998 09:00:32 EST ————————— 204
    MessageID: 980224abe93jas31@hohum.nowhere.com —— 205
    Mime-version: 1.0
    Content-type: multipart/mixed; boundry="NEXT_PART" —— 210
}

220 {
    NEXT_PART
    Content-type: application/postscript
    [...]
}

230 {
    NEXT_PART
    Content-type: text/plain
    [...]
}

240 {
    NEXT_PART
    Content-type: application/msword
    [...]
}

NEXT_PART--
```

[...Other mail headers...]
Subject: ACM-1.0:980302adegov93ag@mailhost —————— 400

1 Launch; Print oak ———————————————————— 401
2 Launch; Print fax "919-555-9453" ——————————— 402
3 Delete ——————————————————————————— 403
4 Detach "c:\files\spreadsheet ————————————— 404

METHOD AND SYSTEM FOR REMOTELY MANAGING ELECTRONIC MAIL ATTACHMENTS

FIELD OF THE INVENTION

This invention relates in general to computer software, and in particular to a method and system for remotely managing attachments contained inside electronic mail. More particularly, the present invention relates to a method and system by which a user may use a low-capability device to direct a software agent to process and deliver large or complex documents embedded inside an electronic mail document.

BACKGROUND OF THE INVENTION

Electronic mail (e-mail) systems have traditionally permitted users to exchange arbitrary text messages. However, e-mail systems have evolved to enable the exchange of a richer variety of content. For example, using the Multipurpose Internet Messaging Extensions (MIME) format, an e-mail message may be divided into multiple sections, each associated with a different content type. For example, one part of the message may be encoded as "text/plain" and contain a standard text message of arbitrary length, while another part may be encoded as "base64" (a way of encoding binary data in a text form) and contain a wordprocessor document, while yet another part may be a "base64" encoding of a LOTUS 123 (Trademark of Lotus Corp.) spreadsheet. In general, therefore, an e-mail message may contain many sub-documents or attachments. To view each part of the e-mail, the e-mail program may need to invoke a different viewer application. An e-mail message may contain many parts, and each part may contain multiple pages of complex layout and graphics.

Recently, there has also been a proliferation of small devices for use by mobile professionals. These devices, for example, cellular phones, two-way pagers, and palm-top computers, are being enabled to support the delivery of electronic mail. For example, the LOTUS PAGER GATEWAY (Trademark of Lotus Corp.) receives electronic mail messages and generates pages containing information on the message sender, subject, and a summary of its textual content. Moreover, the user, upon receiving a page, can initiate an e-mail reply by sending a pager message back to the Pager Gateway. Similar mechanisms are being provided to deliver e-mail (either in the form of textual data or in the form of a voice phone call) to cellular phones.

However, it is impractical to deliver e-mail attachments (i.e. non-textual documents or even long textual documents) to these mobile devices. First, mobile devices are characterized by limited display capabilities. For example, a two-way pager may only be able to display 3–4 lines of alphanumeric text. These devices are generally incapable of displaying large content, and they are certainly incapable of doing so in a manner that preserves the layout and content of the original application. Moreover, the devices have limited memory. They do not have the capacity to store or execute multiple viewer applications to support the potential range of e-mail attachment types. Finally, network bandwidth to these devices is typically quite limited making it is impractical and/or expensive to deliver large attachments to the device.

Existing e-mail systems that deliver messages to client devices simply discard attachments, possibly saving them for later retrieval by the user when he accesses the mail via a desktop or laptop machine over a network having acceptable bandwidth capacity. This approach has the undesirable effect of preventing the mobile user from accessing or manipulating the attachment when he first learns of the e-mail on the mobile device.

Therefore, a need exists for a method and system that allows mobile users to access e-mail attachments from a low-capability device. The user should be able to delete the attachments from the server memory and also be able to remotely invoke the viewing application, control its behavior, and direct its output. For example, he should be able to direct the output to a local printer, initiate its transmission by fax, or initiate a screen reader program to deliver the message over a voice telephone call.

SUMMARY OF THE INVENTION

An object of the present invention is to provide, within a networked environment, a method for accessing e-mail attachments stored on a server from a remote, low-capability client device.

Another object of the present invention is to enable the user to invoke the viewer application for each e-mail attachment.

Yet another object of the present invention is to enable the user to direct the output of the attachment viewer application to an appropriate document delivery method.

To achieve the foregoing objects and in accordance with the purpose of the invention as broadly described herein, a method and system are disclosed for sending commands to a remote software agent that can detach, launch, and deliver e-mail attachments on behalf of a mobile user. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
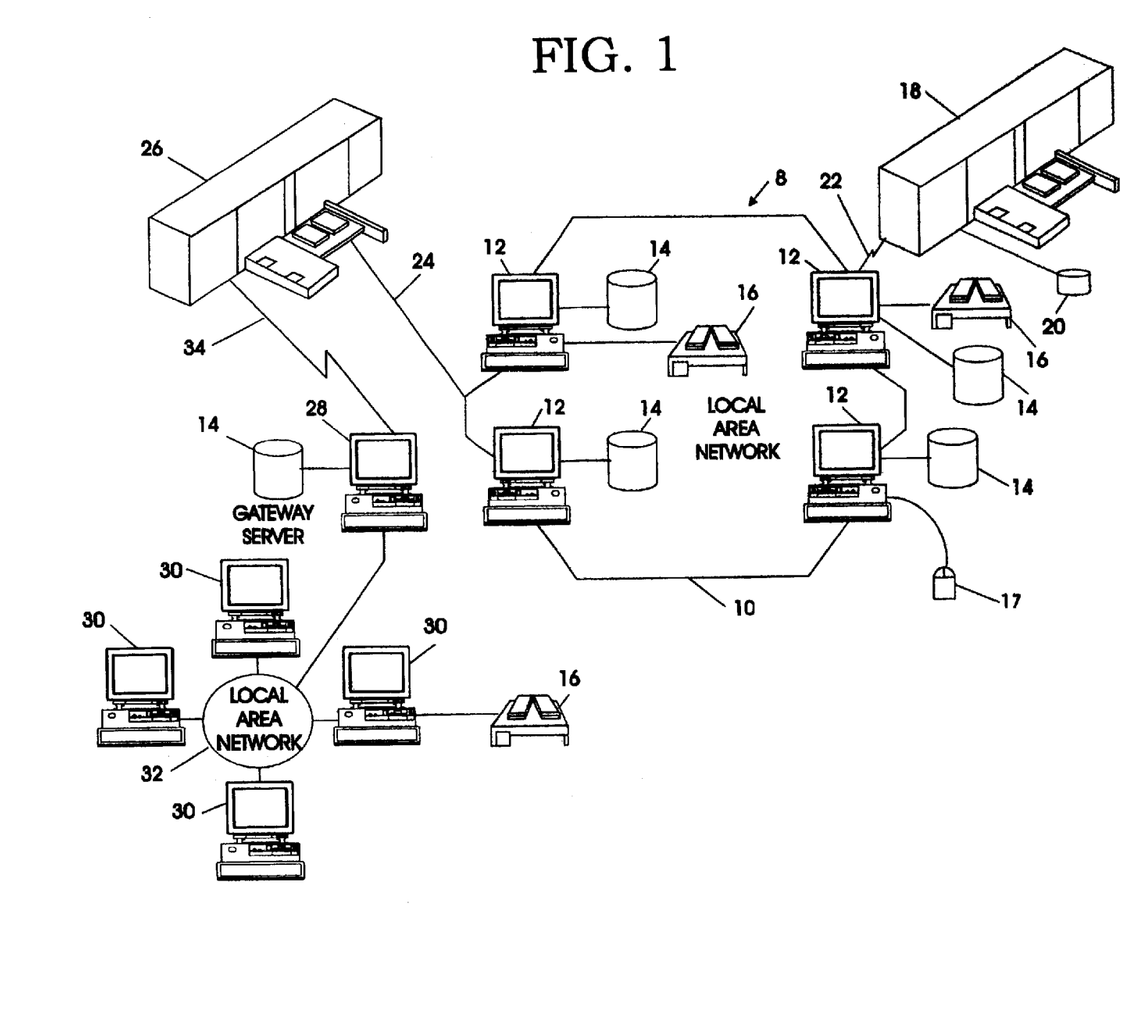
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
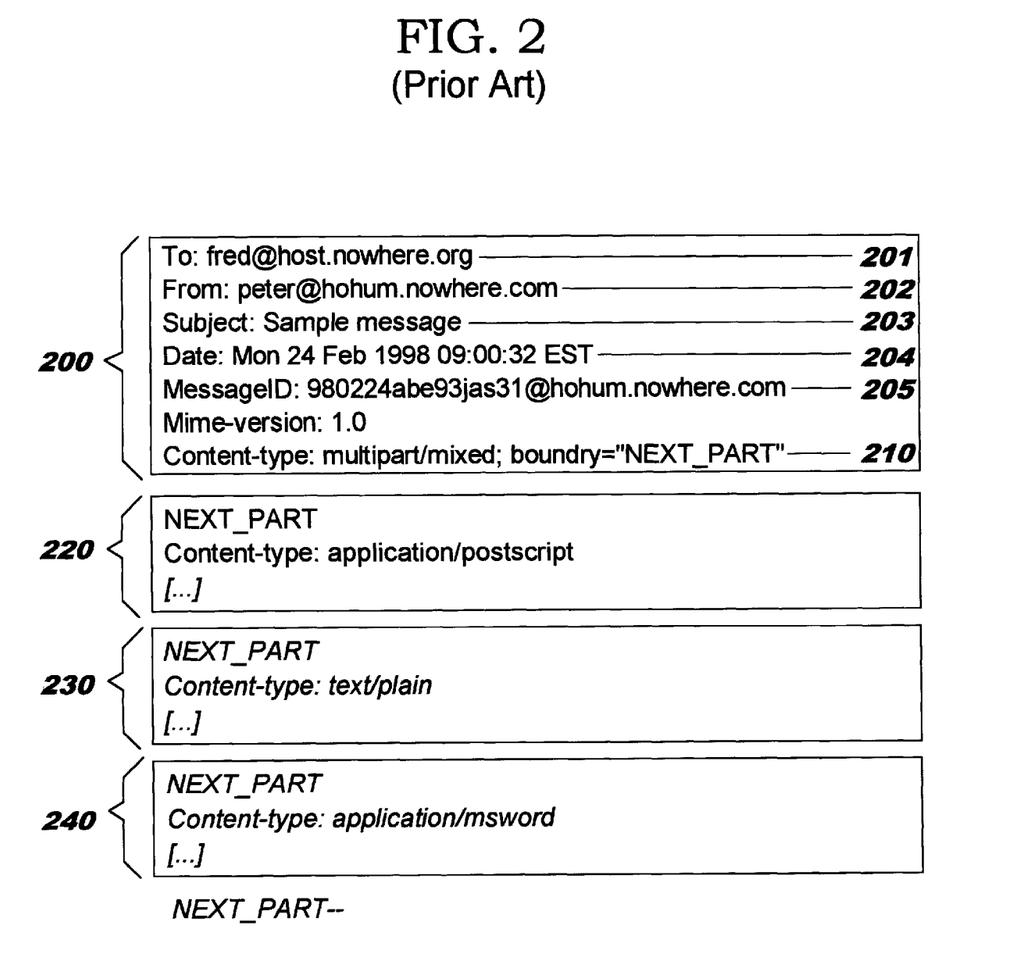
FIG. 2 shows a sample e-mail message encoded using the MIME format in accordance with the prior art.

Referring now to FIG. 2, an example is shown of an e-mail message containing multiple document attachments and encoded using the MIME format in accordance with the prior art. This format is fully specified in RFC 1521 and RFC 1522 (Internet RFCs are published by the Information Sciences Institute, University of Southern California). The e-mail message contains several header fields (designated collectively by reference numeral 200), including 'To:' indicated by reference numeral 201, 'From:' indicated by reference numeral 202, 'Subject:' indicated by reference numeral 203, and 'Date:' indicated by reference numeral 204. Each message is also assigned a unique MessageID, such as is indicated by reference numeral 205, by the mail system that originated the message. MIME encoding is indicated by the presence of a Content-Type: header field 210. The value of this field indicates what type of information is contained in the e-mail message. For example, the e-mail message content may be of type "text/plain" to indicate plain text, or "application/postscript" to indicate a PostScript file, or "application/msword" to indicate a Microsoft WORD (Trademark of Microsoft Corp.) document. The Content-Type field may have optional sub-fields such as the encoding, character set, etc.

As shown in FIG. 2, one valid value for the Content-Type: header is "multipart/mixed" which indicates that the message consists of multiple parts, each having a different type; this header is typically accompanied by a "boundary" attribute. The document is divided into parts, for example, part 220, part 230, and part 240, each distinguished by the presence of a blank line, followed by a boundary attribute, followed by a Content-Type: field which describes the content type for the associated part. The end of the last part is designated by the presence of a blank line, followed by the boundary attribute appended with two hyphens.

Figure 3:
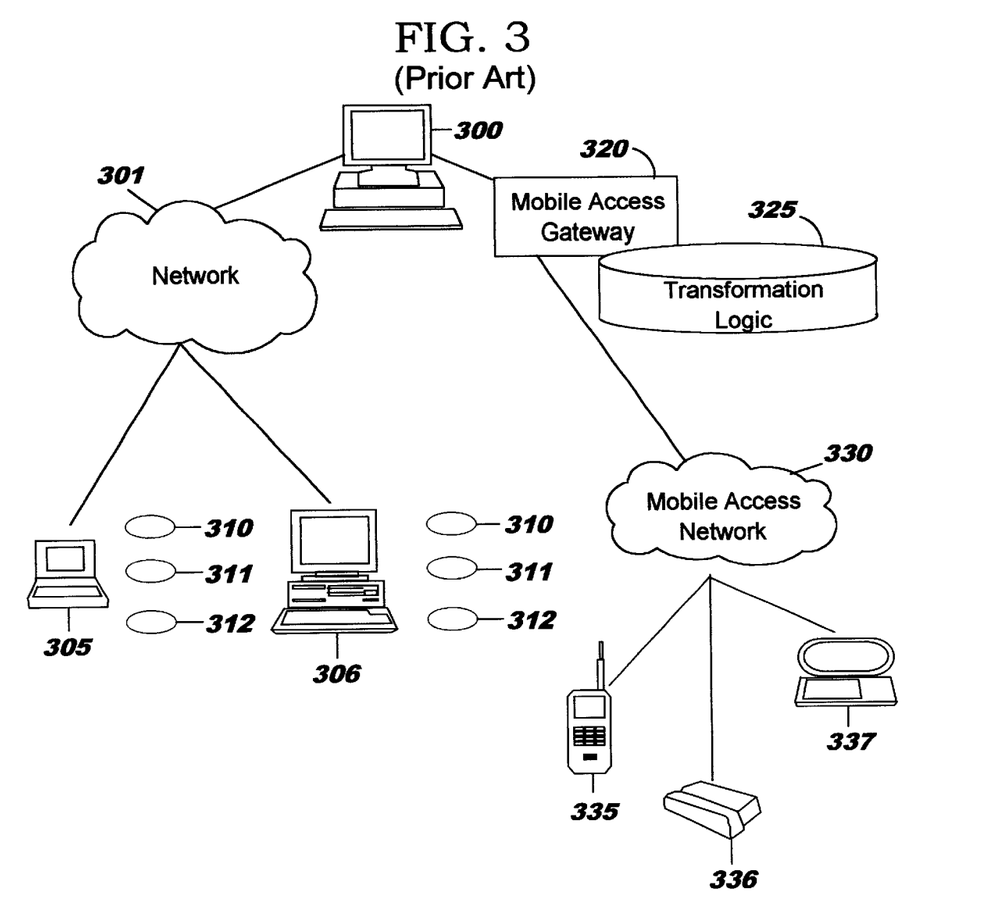
FIG. 3 shows a block diagram of the system components in an e-mail delivery system in accordance with the prior art.

Referring now to FIG. 3, components of an electronic mail (e-mail) delivery system in accordance with the prior art are illustrated. An electronic mail server 300 stores e-mail messages received over a network 301. From a laptop 305 or desktop machine 306, a user may access, read, and delete the e-mail by connecting over network 301 to the e-mail server 300. The e-mail may contain a plurality of document attachments, which the user may view by executing a viewer application (indicated by reference numerals 310, 311, and 312) on the client machine (laptop 305 or desktop machine 306).

In addition, at least one Mobile Access Gateway program 320 may execute in conjunction with the e-mail server 300. The Mobile Access Gateway 320 is notified when the e-mail server 300 receives an inbound message. The Mobile Access Gateway 320 may apply a set of transformation logic 325 to alter the representation of the e-mail message. These rules, for example, remove the e-mail attachments and possibly summarize the rest of the message for efficient network transmission or display to mobile client devices. The Mobile Access Gateway 320 then delivers the manipulated message over a Mobile Access Network 330 to an appropriate client device, such as a cellular telephone 335, pager 336, or palm-top computer 337. Using the client device (335, 336, or 337), a user may also generate new e-mail messages which are sent over the Mobile Access Network 330 to the Mobile Access Gateway 320, which in turn forwards the message through network 301 to its destination.

It should be understood that the physical locations of the components shown in FIG. 3 may differ in alternative embodiments. For example, the laptop 305 or desktop machine 306 may actually be the same machine that runs the e-mail server 300. Similarly, the Mobile Access Gateway 320 need not execute on the same machine as the e-mail server 300; it may execute on the user's laptop 305 or desktop machine 306.

E-mail messages are typically encoded using the Multipurpose Internet Mail Extensions (MIME) format (See RFC 1521 and RFC 1522). The MIME format allows an e-mail message to be divided into multiple parts, each associated with a Content Type, as previously described above. The user uses the Content Type to determine which of the plurality of viewer applications 310, 311, or 312 to apply to view the e-mail part.

When the Mobile Access Gateway 320 processes an e-mail message for delivery to a client device, it must filter the attachments contained in the message before delivering the message to a client device. Attachments cannot be delivered to the client device for several reasons. First, these mobile devices are characterized by limited display capabilities. For example, a two-way pager may only be able to display 3–4 lines of alphanumeric text. They are incapable of displaying large content, and they are certainly incapable of doing so in a manner that preserves the layout and content of the original application. Moreover, the devices have limited memory. They do not have the capacity to store or execute multiple viewer applications to support the potential range of e-mail attachment types. Finally, network bandwidth over a Mobile Access Network to these devices is typically quite limited. Since attachments may be quite large, it is generally impractical and/or too expensive to deliver them to the device.

To address these limitations of prior art systems, the present invention enables client devices to remotely access and manipulate e-mail attachments by generating Attachment Control Messages (ACM). These Attachment Control Messages contain instructions for manipulating the attachments in another e-mail message. In the preferred embodiment of this invention, these ACM messages are themselves encapsulated within e-mail messages generated by the client device and sent over the Mobile Access Network.

To facilitate the remote control of e-mail attachments, the Mobile Access Gateway is extended to provide a Mobile Message Processor (MMP) which intercepts all e-mail messages sent from the client device and determines whether the message is an Attachment Control Message (ACM). If the message is an ACM, then the MMP executes the instructions contained within the message; otherwise, it forwards the outbound e-mail message to network 301, possibly via mail server 300.

Figure 4:
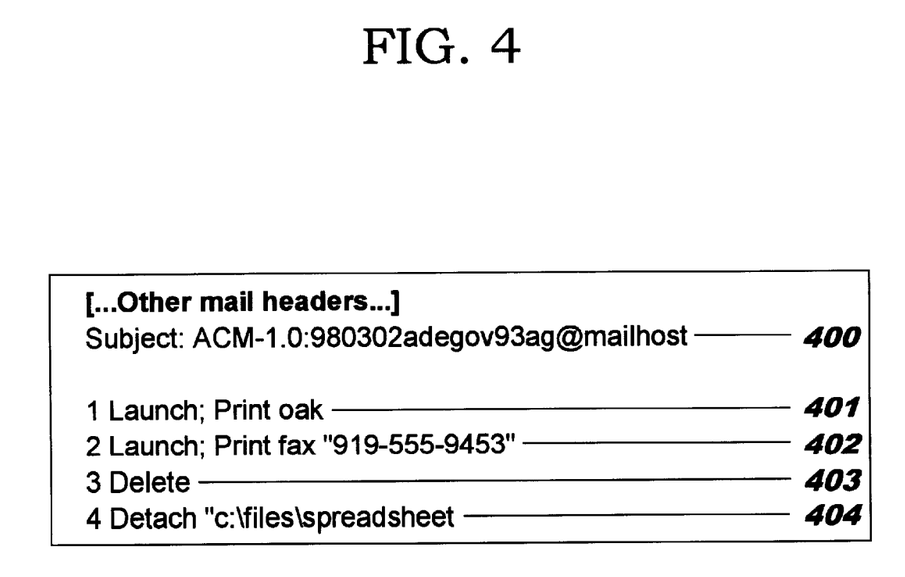
FIG. 4 is an Attachment Control Message in accordance with the present invention.

An ACM contains instructions for manipulating the attachments associated with a particular piece of delivered e-mail. Referring now to FIG. 4, we see the syntax of an ACM in accordance with the present invention. The ACM is detected by parsing a special 'Subject:' line 400 in the message. The subject line includes the keyword "ACM", followed by a version number of the ACM specification. The message shown in FIG. 4 conforms to a version designated as version 1.0 of the ACM message syntax. It is to be understood that further embodiments of this invention may use different versions of the ACM message syntax. The subject line ends with the MessageID associated with the e-mail message whose attachments are being manipulated.

Each line of the ACM identifies a particular attachment in the e-mail message and provides a set of Attachment Commands for manipulating that attachment. In the command syntax shown in FIG. 4, each line begins with a number indicating the appropriate attachment, where "1" indicates the first attachment, "2" indicates the second attachment, and so forth in the message. Line 401 instructs the MMP to launch the application that can process this attachment. The MMP should then instruct that application to print the attachment on a printer named oak. Line 402 instructs the MMP to launch the attachment into the corresponding application and print it to a printer named "fax". This print operation requires an additional parameter (i.e. the fax phone number) which is provided in the ACM command. Line 403 instructs the MMP to delete the third attachment from the e-mail server's memory or storage. Line 404 instructs the MMP to store the attachment as a file with the provided file name.

It should be noted that multiple Attachment Commands may be given for a particular attachment in a single ACM (e.g. detach, print, and delete). Moreover, Attachment Commands may appear in any order in the ACM. Though the preferred embodiment of this invention uses a particular ACM syntax, it should be noted that the command syntax may vary widely across alternative implementations of this invention.

Figure 5:
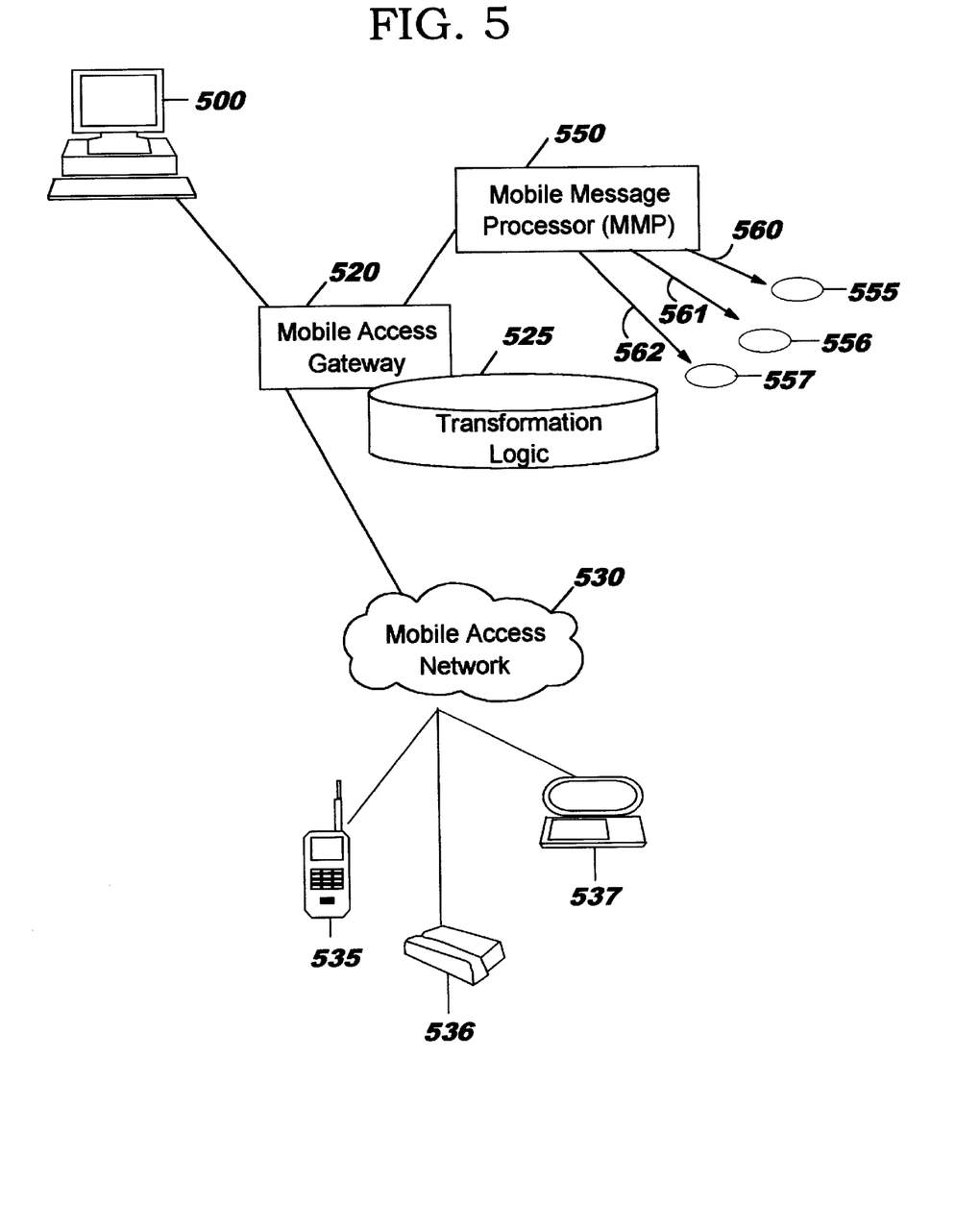
FIG. 5 shows a block diagram of the Mobile Message Processor running viewer applications in accordance with the present invention.

Referring now to FIG. 5, a block diagram illustrates components of a Mobile Access Gateway 520 with an associated MMP 550 in accordance with the present invention. The MMP 550 is coupled to the Mobile Access Gateway 520 and an electronic mail server 500. The Mobile Access Gateway 520 receives messages from mobile devices 535, 536, and 537 over mobile access network 530. The Mobile Access Gateway 520 forwards these messages to the MMP 550 for processing. When processing an ACM message from these devices, the MMP 550 performs the appropriate operation, which may include launching appropriate viewer application 555, 556, or 557 that execute locally to the MMP 550. Control over the behavior of these applications 555, 556, or 557 is provided through connectors 560, 561, and 562, respectively. Connectors 560, 561, and 562 are provided by a particular application or an operating system and are well known in the prior art. Examples include Dynamic Data Exchange (DDE), Common Object Request Broker (CORBA), or Distributed Component Object Model (DCOM). Though not shown in FIG. 5, it is assumed that desktop or laptop access to the electronic mail server 500 may be provided as shown in FIG. 3.

Figure 6:
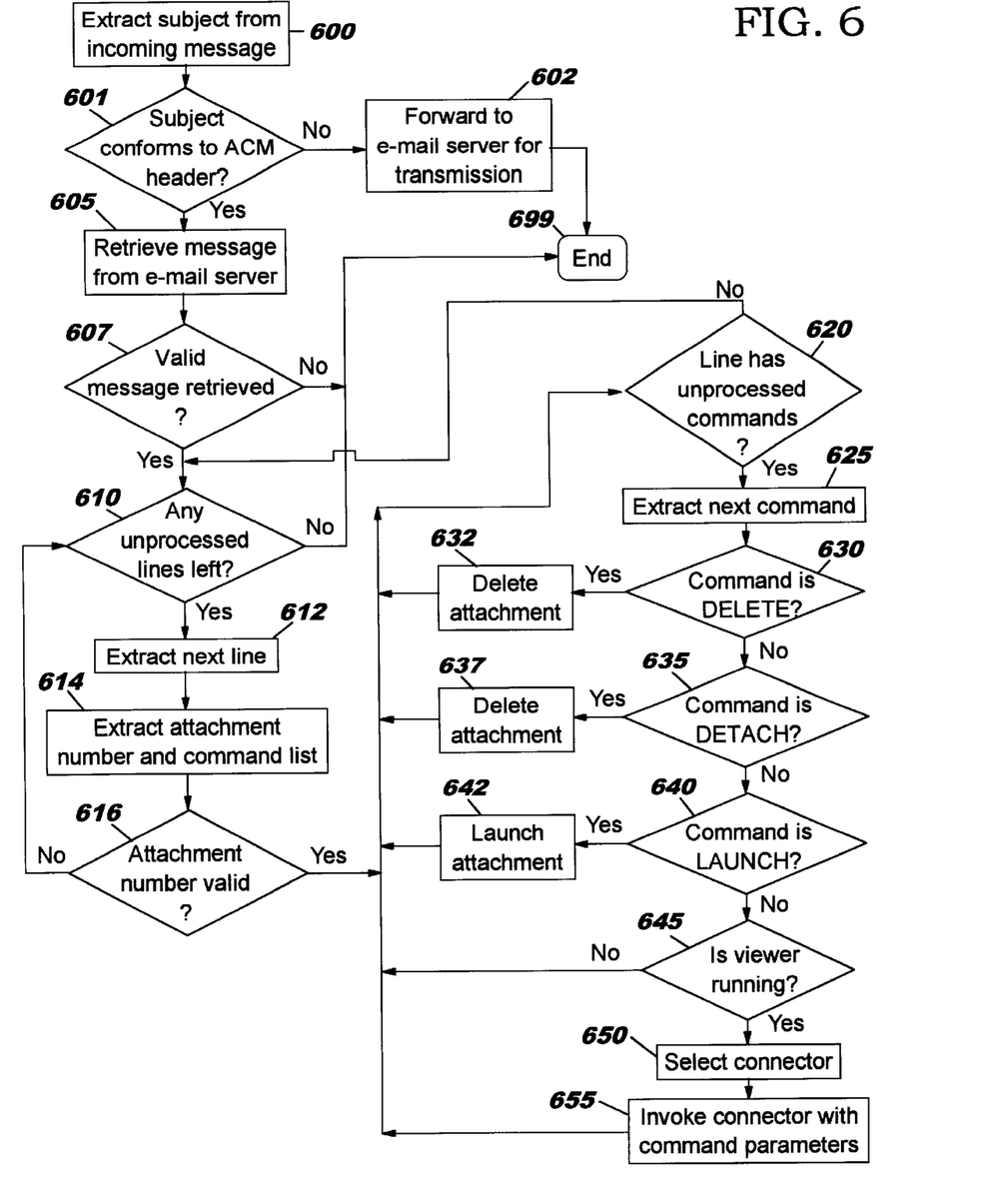
FIG. 6 is a flowchart showing the behavior of the Mobile Message Processor upon receiving a client-generated message in accordance with the present invention.

Referring now to FIG. 6, a flowchart illustrates the steps taken by the Mobile Message Processor (MMP) when it receives a message generated by a client device. The MMP must detect whether the message is an Attachment Control Message, and if so, it must perform the demanded actions. At block 600, the MMP extracts the subject from the incoming message. At decision block 601, the MMP determines whether the subject conforms to the ACM header (as shown in FIG. 4). If the answer to decision block 601 is no, then at block 602, the MMP forwards the message to the e-mail server (server 300 in FIG. 3, server 500 in FIG. 5) for transmission to its final destination. The procedure ends at block 699.

Continuing with FIG. 6, if the answer to decision block 601 is yes, then the MMP concludes that the message is an ACM message which must be processed locally. Although the following steps assume the ACM message format shown in FIG. 4, as mentioned previously, alternative embodiments of this invention may employ a different message syntax and would therefore, employ a slightly different processing procedure to interpret the message.

At block 605, the target message is retrieved from the e-mail server, according to the MessageID contained in the ACM header. At decision block 607, it is determined whether a valid message was retrieved. If the answer to decision block 607 is no, then processing terminates at block 699. Otherwise, the MMP is manipulating a valid ACM message and must process its body one line at a time, beginning at decision block 610.

At decision block 610, the MMP determines whether the message contains any remaining unprocessed lines. If the answer to decision block 610 is no, then processing terminates at block 699. If the answer to decision block 610 is yes, then at block 612, the next unprocessed line is extracted from the ACM message. At block 614, this line is parsed to yield an attachment number and a list of commands (which were separated by semi-colons on the message line). At decision block 616, it is determined whether the attachment number corresponds to an attachment in the retrieved target message. If the answer to decision block 616 is no, it is determined that the current message line is invalid, and control returns to decision block 610. Otherwise, it is concluded that a valid command(s) must be processed for the identified attachment.

Continuing with FIG. 6, at decision block 620, it is determined whether there are any more unprocessed Attachment Commands listed on the current line in the ACM. If the answer to decision block 620 is no, then control returns to decision block 610 where the next line of the message is processed. If the answer to decision block 620 is yes, then at block 625, the next Attachment Command is determined from the list.

At decision block 630, it is determined whether the command is "delete". If the answer to decision block 630 is yes, then at block 632, the attachment is deleted from the target e-mail message, and the modification is pushed back to the e-mail server. Control then returns to decision block 620.

If the answer to decision block 630 is no, then at decision block 635, it is determined whether the command is "detach". If the answer to decision block 635 is yes, then at block 637, the attachment is stored on disk according to the file and path names included in the command's parameters. Control then returns to decision block 620.

If the answer to decision block 635 is no, then at decision block 640, it is determined whether the command is "launch". If the answer to decision block 640 is yes, then at block 642, the MMP notifies the operating system to execute the appropriate program for displaying the attachment. Selection of the viewer application may be performed in a variety of platform-dependent ways in accordance with the prior art. For example, on the WINDOWS (Trademark of Microsoft Corp.) operating system, the application is typically determined by accessing the system registry. On other systems, the application may be determined by accessing a local lookup file or by querying an external directory (such as LDAP). Control then returns to decision block 620.

If the answer to decision block 640 is no, then it is determined that the user wishes to control the viewer application. At decision block 645, it is determined whether a viewer application is currently running for the identified attachment. If the answer to decision block 645 is no, then it is determined that the command is semantically invalid, and control returns immediately to decision block 620. If the answer to decision block 645 is yes, then at block 650, the MMP selects the appropriate Connector for the viewer application. The connector is used to allow an external piece of software to issue commands to the viewer application. In the present embodiment of this invention, the connector's identity is explicitly coded into the MMP, though alternative implementations might query the application or operating system to identify the appropriate connector means. At block 655, the user's command and its parameters are passed to the connector for processing by the viewer application. Control then returns to block 620.

Thus, a user's mobile message is processed by the MMP, which allows remote users to detach, launch, and delete e-mail message attachments. Moreover, once a viewer application has been launched, additional commands can be passed to remotely control the viewer (e.g. make it print the document to a designated printer or over the network). The mobile user, therefore, is able to remotely view and manage his e-mail attachments without having to download the data over the low capacity wireless link.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. In a networked environment, a method of remotely accessing and manipulating electronic mail containing a plurality of attachments, comprising the steps of:

electronically delivering the mail to a mobile client;

constructing an Attachment Control Message at the mobile client, said Attachment Control Message containing a plurality of Attachment Commands, each of said Attachment Commands containing instructions for remotely processing the plurality of attachments; and processing said Attachment Control Message at a Mobile Message Processor.

2. The method of claim 1, wherein said step of delivering the mail to a mobile client further comprises:

manipulating the content of said mail so that it may be suitably displayed on said mobile client.

3. The method of claim 1, wherein said Attachment Control Message takes the form of a new electronic mail message and is distinguished from other outbound electronic mail messages by specially encoding the Subject field of said new electronic mail message.

4. The method of claim 3, wherein said step of processing the Attachment Control Message includes the steps of:

receiving an electronic mail transmission from said mobile client;

inspecting a Subject field of said electronic mail transmission;

determining whether encoding of said Subject field of said electronic mail transmission conforms to a format for an Attachment Control Message;

forwarding said electronic mail transmission to a mail server if said step of determining indicates that said electronic mail transmission does not conform to an Attachment Control Message; and processing contents of said electronic mail transmission as an Attachment Control Message if said step of determining indicates that said electronic mail transmission conforms to an Attachment Control Message.

5. In a networked environment, a method of remotely accessing and manipulating electronic mail containing a plurality of attachments, comprising the steps of:

electronically delivering the mail to a mobile client;

constructing an Attachment Control Message at the mobile client, said Attachment Control Message containing a plurality of Attachment Commands for remotely processing the plurality of attachments;

extracting said plurality of Attachment Commands from said Attachment Control Message;

interpreting each of said plurality of Attachment Commands; and initiating an action in response to each of said plurality of Attachment Commands.

6. The method of claim 5, wherein each of said plurality of Attachment Commands instructs said Mobile Message Processor to delete an attachment from said mail.

7. The method of claim 5, wherein each of said plurality of Attachment Commands instructs said Mobile Message Processor to detach an attachment from said mail.

8. The method of claim 5, wherein each of said plurality of Attachment Commands instructs said Mobile Message Processor to launch a viewer application for an attachment from said mail.

9. The method of claim 8, wherein said viewer application is selected by accessing a system Registry.

10. The method of claim 8, wherein said viewer application is selected by accessing a configuration file.

11. The method of claim 8, wherein said viewer application is selected by accessing a directory service.

12. The method of claim 5, wherein said each of said plurality of Attachment Commands instructs said Mobile Message Processor to send instructions to a viewer application associated with an attachment from said mail message.

13. The method of claim 12, wherein said instructions are conveyed to said viewer application through a Connector.

14. The method of claim 13, wherein said Connector employs Dynamic Data Exchange.

15. The method of claim 13, wherein said Connector employs Common Object Request Broker (CORBA).

16. The method of claim 13, wherein said Connector employs Distributed Component Object Model (DCOM).

17. In a networked environment, a system for remotely accessing and manipulating electronic mail containing a plurality of attachments, comprising:
  means for electronically delivering the mail to a mobile client;
  means for constructing an Attachment Control Message at the mobile client, said Attachment Control Message containing a plurality of Attachment Commands, each of said Attachment Commands containing instructions for remotely processing the plurality of attachments; and
  means for processing said Attachment Control Message at a Mobile Message Processor.

18. The system of claim 17, wherein said means for delivering the mail to a mobile client further comprises:
  means for manipulating the content of said mail so that it may be suitably displayed on said mobile client.

19. The system of claim 17, wherein said Attachment Control Message takes the form of a new electronic mail message and is distinguished from other outbound electronic mail messages by specially encoding the Subject field of said new electronic mail message.

20. The system of claim 19, wherein said means for processing the Attachment Control Message includes:
  means for receiving an electronic mail transmission from said mobile client;
  means for inspecting a Subject field of said electronic mail transmission;
  means for determining whether encoding of said Subject field of said electronic mail transmission conforms to a format for an Attachment Control Message;
  means for forwarding said electronic mail transmission to a mail server if said means for determining indicates that said electronic mail transmission does not conform to an Attachment Control Message; and
  means for processing the contents of said electronic mail transmission as an Attachment Control Message if said means for determining indicates that said electronic mail transmission conforms to an Attachment Control Message.

21. In a networked environment, a system for remotely accessing and manipulating electronic mail containing a plurality of attachments, comprising:
  means for electronically delivering the mail to a mobile client;
  means for constructing an Attachment Control Message at the mobile client, said Attachment Control Message containing a plurality of Attachment Commands for remotely Processing the plurality of attachments;
  means for extracting said plurality of Attachment Commands from said Attachment Control Message;
  means for interpreting each of said plurality of Attachment Commands; and
  means for initiating an action in response to each of said plurality of Attachment Commands.

22. The system of claim 21, wherein each of said plurality of Attachment Commands instructs said Mobile Message Processor to delete an attachment from said mail message.

23. The system of claim 21, wherein each of said plurality of Attachment Commands instructs said Mobile Message Processor to detach an attachment from said mail message.

24. The system of claim 21, wherein each of said plurality of Attachment Commands instructs said Mobile Message Processor to launch a viewer application for an attachment from said mail message.

25. The system of claim 24, wherein said viewer application is selected by accessing a system Registry.

26. The system of claim 24, wherein said viewer application is selected by accessing a configuration file.

27. The system of claim 24, wherein said viewer application is selected by accessing a directory service.

28. The system of claim 21, wherein said each of said plurality of Attachment Commands instructs said Mobile Message Processor to send instructions to a viewer application associated with an attachment from said mail message.

29. The system of claim 28, wherein said instructions are conveyed to said viewer application through a Connector.

30. The system of claim 29, wherein said Connector employs Dynamic Data Exchange.

31. The system of claim 29, wherein said Connector employs Distributed Component Object Model (DCOM).

32. The system of claim 29, wherein said Connector employs Distributed Component Object Model (DCOM).

33. In a networked environment, a computer program product recorded on computer readable medium for remotely accessing and manipulating electronic mail containing a plurality of attachments, comprising:
  computer readable means for electronically delivering the mail to a mobile client;
  computer readable means for constructing an Attachment Control Message at the mobile client, said Attachment Control Message containing a plurality of Attachment Commands, each of said Attachment Commands containing instructions for remotely processing the plurality of attachments; and
  computer readable means for processing said Attachment Control Message at a Mobile Message Processor constructing an Attachment Control Message.

34. The program product of claim 33, wherein said computer readable means for delivering the mail to a mobile client further comprises:
  computer readable means for manipulating the content of said mail so that it may be suitably displayed on said mobile client.

35. The program product of claim 33, wherein said Attachment Control Message takes the form of a new electronic mail message and is distinguished from other outbound electronic mail messages by specially encoding the Subject field of said new electronic mail message.

36. The program product of claim 35, wherein said computer readable means for processing the Attachment Control Message includes:
  computer readable means for receiving an electronic mail transmission from said mobile client;
  computer readable means for inspecting a Subject field of said electronic mail transmission;
  computer readable means for determining whether encoding of said Subject field of said electronic mail transmission conforms to a format for an Attachment Control Message;

computer readable means for forwarding said electronic mail transmission to a mail server if said computer readable means for determining indicates that said electronic mail transmission does not conform to an Attachment Control Message; and computer readable means for processing contents of said electronic mail transmission as an Attachment Control Message if said computer readable means for determining indicates that said electronic mail transmission conforms to an Attachment Control Message.

37. In a networked environment, a computer program product recorded on computer readable medium for remotely accessing and manipulating electronic mail containing a plurality of attachments, comprising:

computer readable means for electronically delivering the mail to a mobile client;

computer readable means for constructing an Attachment Control Message at the mobile client, said Attachment Control Message containing a plurality of Attachment Commands for remotely processing the Plurality of attachments;

computer readable means for extracting said plurality of Attachment Commands from said Attachment Control Message;

computer readable means for interpreting each of said plurality of Attachment Commands; and computer readable means for initiating an action in response to each of said plurality of Attachment Commands.

38. The program product of claim 37, wherein each of said plurality of Attachment Commands instructs said Mobile Message Processor to delete an attachment from said mail message.

39. The program product of claim 37, wherein each of said plurality of Attachment Commands instructs said Mobile Message Processor to detach an attachment from said mail message.

40. The program product of claim 37, wherein each of said plurality of Attachment Commands instructs said Mobile Message Processor to launch a viewer application for an attachment from said mail message.

41. The program product of claim 40, wherein said viewer application is selected by accessing a system Registry.

42. The program product of claim 40, wherein said viewer application is selected by accessing a configuration file.

43. The program product of claim 40, wherein said viewer application is selected by accessing a directory service.

44. The program product of claim 37, wherein said each of said plurality of Attachment Commands instructs said Mobile Message Processor to send instructions to a viewer application associated with an attachment from said mail message.

45. The program product of claim 44, wherein said instructions are conveyed to said viewer application through a Connector.

46. The program product of claim 45, wherein said Connector employs Dynamic Data Exchange.

47. The program product of claim 45, wherein said Connector employs Distributed Component Object Model (DCOM).

48. The program product of claim 45, wherein said Connector employs Distributed Component Object Model (DCOM).

* * * * *